(12) United States Patent
Yoda

(10) Patent No.: US 9,509,779 B2
(45) Date of Patent: Nov. 29, 2016

(54) INFORMATION PROCESSING APPARATUS, INFORMATION PROCESSING METHOD, AND STORAGE MEDIUM

(71) Applicant: FUJI XEROX CO., LTD., Minato-ku, Tokyo (JP)

(72) Inventor: Yoshiyuki Yoda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 329 days.

(21) Appl. No.: 13/903,484

(22) Filed: May 28, 2013

(65) Prior Publication Data

US 2014/0122740 A1   May 1, 2014

(30) Foreign Application Priority Data

Oct. 30, 2012   (JP) ................. 2012-238898

(51) Int. Cl.
G06F 15/173 (2006.01)
H04L 29/08 (2006.01)

(52) U.S. Cl.
CPC .................... H04L 67/16 (2013.01)

(58) Field of Classification Search
CPC ....................................... H04L 67/16
See application file for complete search history.

(56) References Cited

U.S. PATENT DOCUMENTS

| | | | |
|---|---|---|---|
| 7,477,600 B1* | 1/2009 | Mor et al. | 370/231 |
| 7,751,336 B2* | 7/2010 | Hopps et al. | 370/248 |
| 7,808,983 B2* | 10/2010 | Joly | 370/389 |
| 8,891,588 B1* | 11/2014 | Hui et al. | 375/133 |
| 2003/0090694 A1* | 5/2003 | Kennedy | G06F 3/1204 358/1.13 |
| 2004/0185877 A1* | 9/2004 | Asthana | G06Q 30/02 455/456.6 |
| 2004/0259533 A1* | 12/2004 | Nixon | H04W 40/24 455/414.1 |
| 2006/0187847 A1* | 8/2006 | Pelton et al. | 370/252 |
| 2006/0188327 A1* | 8/2006 | Moon | 403/325 |
| 2007/0061482 A1* | 3/2007 | Higuchi | H04L 69/32 709/238 |
| 2007/0087778 A1* | 4/2007 | Otsuka | 455/550.1 |
| 2007/0258456 A1* | 11/2007 | Khouderchah et al. | 370/392 |
| 2008/0005296 A1* | 1/2008 | Lee et al. | 709/223 |

(Continued)

FOREIGN PATENT DOCUMENTS

| | | |
|---|---|---|
| JP | 2000-092121 A | 3/2000 |
| JP | 2001119452 A | 4/2001 |

(Continued)

OTHER PUBLICATIONS

Communication dated Jan. 5, 2016, from the Japanese Patent Office in counterpart application No. 2012-238898.

*Primary Examiner* — Krisna Lim
(74) *Attorney, Agent, or Firm* — Sughrue Mion, PLLC

(57) ABSTRACT

An information processing apparatus includes plural communication interfaces, a storing unit, an acquisition unit, and a selection unit. The plural communication interfaces are connected to plural communication networks that are independent of each other, and receive data from a terminal connected to the communication network and transmit data to the terminal on the basis of positional information that indicates a position of the terminal on the communication network. The storing unit stores correlation information including correlation between a user of the terminal at the time when data are received from the terminal and one of the plural communication interfaces that is used. The acquisition unit acquires user information that indicates a user that commands transmission of data to the terminal. The selection unit selects one of the plural communication interfaces on the basis of the correlation information and the user information.

6 Claims, 3 Drawing Sheets

(56) References Cited

U.S. PATENT DOCUMENTS

| | | | |
|---|---|---|---|
| 2008/0174806 A1* | 7/2008 | Singh | G06F 17/30011 358/1.15 |
| 2009/0080014 A1* | 3/2009 | Kurokawa et al. | 358/1.15 |
| 2011/0128970 A1* | 6/2011 | Breton et al. | 370/463 |
| 2012/0105905 A1* | 5/2012 | Wei | G06F 3/1204 358/1.15 |
| 2013/0022046 A1* | 1/2013 | Vasseur et al. | 370/392 |
| 2013/0150072 A1* | 6/2013 | Kapoor et al. | 455/456.1 |

FOREIGN PATENT DOCUMENTS

| | | |
|---|---|---|
| JP | 2007221547 A | 8/2007 |
| JP | 2008016932 A | 1/2008 |

* cited by examiner

FIG. 2

| COMMUNICATION INTERFACE 1 | COMMUNICATION INTERFACE 2 |
|---|---|
| USER 11<br>(PC11, 192.168.1.6, 11/11/2011, 10:04) | USER 21<br>(PC21, 192.168.1.7, 11/01/2011, 20:20) |
| USER 12<br>(PC12, 192.168.1.7, 11/13/2011, 11:50) | USER 22<br>(PC22, 192.168.1.8, 11/11/2011, 11:11) |
| USER 13<br>(PC13, 192.168.1.8, 11/15/2011, 09:20) | USER 23<br>(PC23, 192.168.1.9, 11/14/2011, 15:23) |

INFORMATION PROCESSING APPARATUS, INFORMATION PROCESSING METHOD, AND STORAGE MEDIUM

CROSS-REFERENCE TO RELATED APPLICATIONS

This application is based on and claims priority under 35 USC 119 from Japanese Patent Application No. 2012-238898 filed Oct. 30, 2012.

BACKGROUND

Technical Field

The present invention relates to an information processing apparatus, an information processing method, and a storage medium.

SUMMARY

According to an aspect of the present invention, there is provided an information processing apparatus including: plural communication interfaces connected to plural communication networks that are independent of each other, the plural communication interfaces receiving data from a terminal connected to the communication network and transmitting data to the terminal on the basis of positional information that indicates a position of the terminal on the communication network; a storing unit that stores correlation information including correlation between a user of the terminal at the time when data are received from the terminal and one of the plural communication interfaces that is used; an acquisition unit that acquires user information that indicates a user that commands transmission of data to the terminal; and a selection unit that selects one of the plural communication interfaces on the basis of the correlation information and the user information.

BRIEF DESCRIPTION OF THE DRAWINGS

An exemplary embodiment of the present invention will be described in detail based on the following figures, wherein:

FIG. 2 shows an example of a content of a database; and

DETAILED DESCRIPTION

An information processing apparatus and a program according to an exemplary embodiment of the present invention will be described with reference to the drawings.

Figure 1:
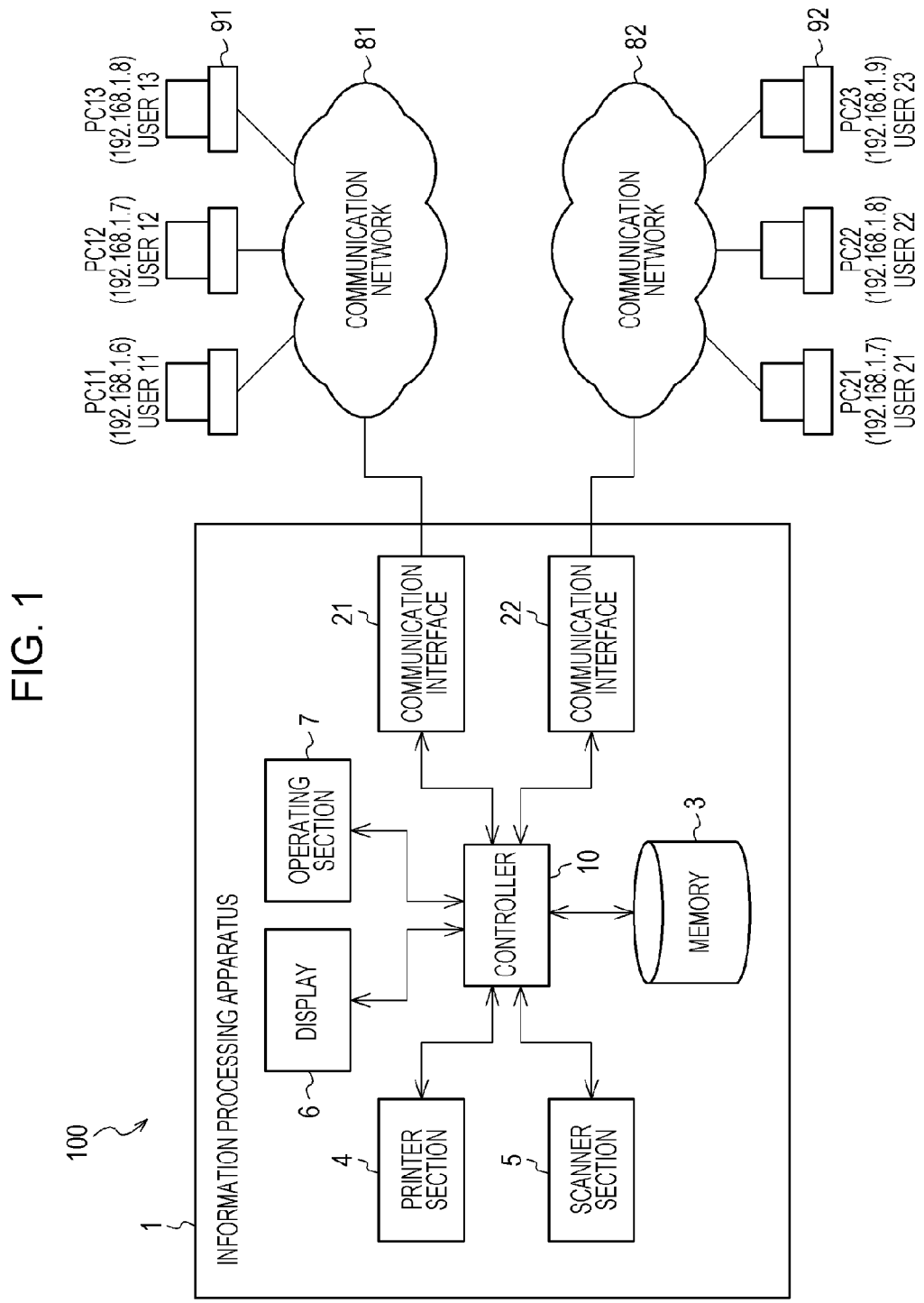
FIG. 1 shows an example of the configuration of an information processing system.

FIG. 1 shows an example of the configuration of an information processing system 100. The information processing system 100 includes an information processing apparatus 1, plural terminals 91, and plural terminals 92. The information processing apparatus 1 is connected to both of plural communication networks 81 and 82 that are independent of each other. The plural terminals 91 are connected to the first communication network 81. The information processing apparatus 1 and each of the terminals 91 are capable of data communication with each other via the first communication network 81. The plural terminals 92 are connected to the second communication network 82. The information processing apparatus 1 and each of the terminals 92 are capable of data communication with each other via the second communication network 82.

The information processing apparatus 1 is configurated as a device including a printer function and a scanner function. The information processing apparatus 1 includes a controller 10, plural communication interfaces 21 and 22, a memory 3, a printer section 4, a scanner section 5, a display 6, and an operating section 7.

The controller 10 includes a computing section such as a central processing unit (CPU) and a memory such as a random access memory (RAM), for example. The controller 10 processes information in accordance with a program. The program may be provided from a computer-readable information recording medium such as a CD-ROM, or may be provided via a communication line such as the Internet.

The communication interfaces 21 and 22 are devices for communication with other devices (the terminals 91 and 92, for example) via the communication networks 81 and 82, respectively. The first communication interface 21 is connected to the first communication network 81, and capable of communication with each of the terminals 91. The second communication interface 22 is connected to the second communication network 82, and capable of communication with each of the terminals 92. Specifically, the communication interfaces 21 and 22 deliver data received from the terminals 91 and 92, respectively, to the controller 10. In addition, the communication interfaces 21 and 22 transmit data received from the controller 10 to the terminals 91 and 92, respectively.

The memory 3 is a hard disk drive (HDD) or a solid state drive (SSD), for example. The memory 3 stores a database that is accessible by the controller 10. The database may be stored in a device different from the information processing apparatus 1.

The printer section 4 is a unit that implements the printer function, and forms an image on a surface of a medium in accordance with a command from the controller 10. The scanner section 5 is a unit that implements the scanner function, and outputs image data read from a surface of a medium to the controller 10.

The display 6 is a liquid-crystal display panel, for example. The operating section 7 is a touch panel, for example.

The terminals 91 and 92 are each a personal computer, for example. The terminals 91 and 92 transmit data to the information processing apparatus 1, and receive data from the information processing apparatus 1. For example, the terminals 91 and 92 transmit a print job to the information processing apparatus 1, and receive image data from the information processing apparatus 1.

In specifying a destination for transmission of data, in general, positional information that indicates a position on a communication network such as an Internet protocol (IP) address is used.

However, the information processing apparatus 1 according to the exemplary embodiment is connected to the plural communication networks 81 and 82 that are independent of each other, and thus may not be able to thoroughly specify a destination of transmission of data using only the positional information described above. That is, positional information on the terminal 91 connected to the communication network 81 and positional information on the terminal 92 connected to the communication network 82 may coincide with each other in certain situations, and it may not be determined which of the terminals 91 and 92 to transmit data to in such situations.

In the exemplary embodiment, in view of such state of the art, the following process is executed.

FIG. 2 shows an example of a content of a database. The memory 3 stores a history database that stores a history of use of the information processing apparatus 1 by the terminals 91 and 92. In the history database, user information is correlated with each of the communication interfaces 21 and 22. The user information is further correlated with terminal information, positional information, and the time of use.

That is, the history database stores correlation information including correlation between a user of the terminals 91 and 92 at the time when the information processing apparatus 1 received data such as a print job from the terminals 91 and 92 in the past and one of the plural communication interfaces 21 and 22 used in the reception.

The user information includes a log-on user name for the terminals 91 and 92 that used the information processing apparatus 1, for example. The terminal information includes a terminal name of the terminals 91 and 92 that used the information processing apparatus 1, for example. The positional information includes an IP address of the terminals 91 and 92 that used the information processing apparatus 1, for example.

The various types of information stored in the history database are extracted from a job header of a print job received by the information processing apparatus 1 from the terminals 91 and 92, for example.

The information processing apparatus 1 may request the various types of information such as a current log-in user name from the terminals 91 and 92 when the information processing apparatus 1 receives a print job from the terminals 91 and 92.

Besides, the information processing apparatus 1 may request the various types of information such as a current log-in user name from the terminals 91 and 92 when the information processing apparatus 1 and the terminals 91 and 92 perform communication over a protocol different from a print job. Communication over a different protocol is performed, for example, when the terminals 91 and 92 access using HTTP (Hyper Text Transfer Protocol) to the information processing apparatus 1 functioning as a web server or the like.

The information processing apparatus 1 may detect the terminals 91 and 92 on the communication networks 81 and 82, respectively, at a timing determined in advance, and request the various types of information such as a current log-in user name from the detected terminals 91 and 92. The detection may be performed, for example, at the start of the information processing apparatus 1, when the information processing apparatus 1 receives a particular packet, at intervals determined in advance, or the like.

Figure 3:
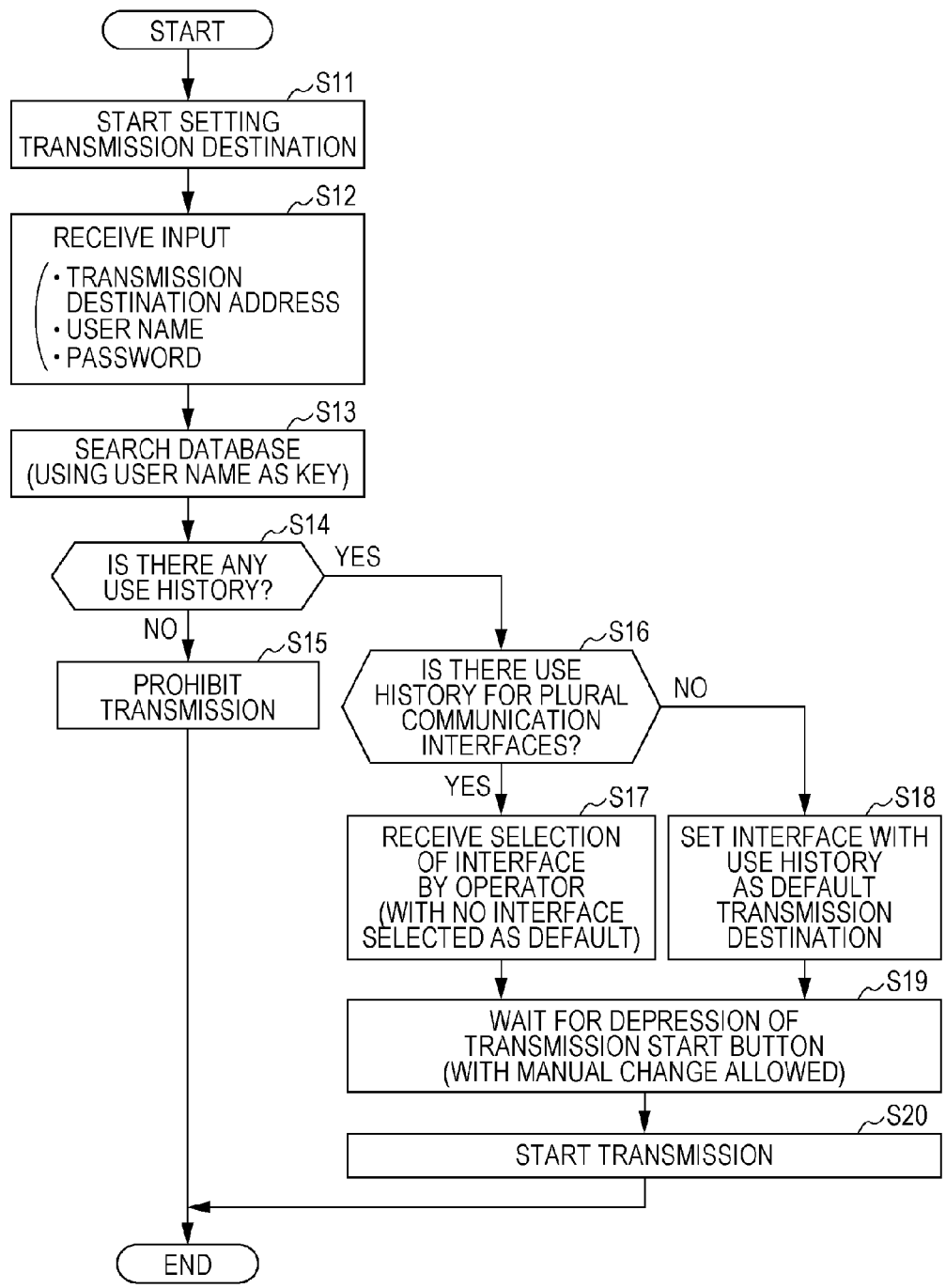
FIG. 3 shows an example of operation of an information processing apparatus.

FIG. 3 shows an example of operation of the information processing apparatus 1. The process described below is implemented by the controller 10 executing a program. The controller 10 functions as an example of a storing unit, an acquisition unit, and a selection unit.

As discussed above, the memory 3 stores the history database. The controller 10 may reference information stored in the history database. That is, the controller 10 functions as an example of the storing unit that stores the correlation information including correlation between the communication interfaces 21 and 22 and the user information.

In S11, the controller 10 starts setting a destination for transmission of data. Specifically, the controller 10 displays on the display 6 a setting screen for setting a destination for transmission of data. For example, the setting screen is displayed in the case where image data scanned by the scanner section 5 are to be transmitted to the terminals 91 and 92 on the communication networks 81 and 82, respectively (for example, the function of "Scan to SMB").

In S12, the controller 10 receives input from a user. Specifically, when the user operates the operating section 7 while seeing the setting screen displayed on the display 6, the controller 10 acquires from the operating section 7 information input by the user. Examples of the information input by the user include a transmission destination address, a user name, and a password. In this way, the controller 10 functions as an example of the acquisition unit that acquires user information on the user that commands transmission of data. The transmission destination address may be an IP address, or a fully qualified domain name (FQDN).

In S13 and S14, the controller 10 searches the history database to determine whether or not there is any use history for the user name acquired from the operating section 7.

If there is no use history (S14: NO), the process proceeds to S15, where the controller 10 prohibits data transmission. That is, if there is no use history, it is difficult to determine which of the plural communication interfaces 21 and 22 to use, and thus transmission is prohibited.

If there is a use history (S14: YES), the process proceeds to S16, where the controller 10 determines whether or not there is a use history for the plural communication interfaces 21 and 22.

If there is a use history for the plural communication interfaces 21 and 22 (S16: YES), the process proceeds to S17, where the controller 10 receives a user selection of one of the communication interfaces 21 and 22. Specifically, the controller 10 displays on the display 6 a selection screen that allows the user to select one of the plural communication interfaces 21 and 22 to be used for transmission. In this event, none of the communication interfaces 21 and 22 has been selected as a default on the selection screen, and it is necessary for the user to perform an operation to select which one to use for transmission. That is, if there is a use history for the plural communication interfaces 21 and 22, it is difficult to determine which to use, and thus a default selection is not made.

If there is not a use history for the plural communication interfaces 21 and 22 (S16: NO), the process proceeds to S18, where the controller 10 displays on the display 6 a selection screen on which one of the plural communication interfaces 21 and 22 with a use history is selected as a default. That is, if there is a use history for only one of the plural communication interfaces 21 and 22, the one of the plural communication interfaces 21 and 22 with a use history is probably the one to be used, and thus a default selection is made. This reduces the burden for a selection operation to be performed by the user. In this way, the controller 10 functions as an example of the selection unit that selects one of the plural communication interfaces 21 and 22.

In S19, the controller 10 waits for a "transmission start button" provided on the selection screen to be depressed. If S19 has been reached by way of S17, the user depresses the "transmission start button" after making an operation to select which of the plural communication interfaces 21 and 22 to use for transmission. If S19 has been reached by way of S18, the user may depress the "transmission start button" without making a select operation himself/herself since one of the plural communication interfaces 21 and 22 with a use history has been selected as a default. In the case where the one of the plural communication interfaces 21 and 22 selected as a default is not intended by the user, the user may depress the "transmission start button" after making an operation to reselect which of the plural communication interfaces 21 and 22 to use for transmission.

When the "transmission start button" is depressed, the process proceeds to S20, where the controller 10 transmits data using the one of the plural communication interfaces 21 and 22 selected on the selection screen. The process is thus finished.

The items to select from displayed on the selection screen may be the names of the plural communication interfaces 21 and 22, the names of the plural communication interfaces 81 and 82 connected to the plural communication interfaces 21 and 22, respectively, and so forth.

The default selection may be made on the basis of not only user information but also positional information such as an IP address. For example, conditions for the default selection may include both a fact that there is a history of use by the user for any of the plural communication interfaces 21 and 22 and a fact that the transmission destination address input by the user and the IP address in the use history match each other.

While an exemplary embodiment of the present invention has been described above, the present invention is not limited to the exemplary embodiment, and it is a matter of course that various modifications may be made by those skilled in the art.

What is claimed is:

1. An information processing apparatus comprising:
  a plurality of communication interfaces connected to a plurality of independent communication networks,
    wherein one of the communication interfaces is configured to receive data from a terminal connected to one of the communication networks and to transmit data to the terminal using positional information that indicates a position of the terminal on the one of the communication networks;
  a storing unit configured to, in response to data being received from the terminal, store correlation information including correlation between first user information indicating a user of the terminal sending the data and the one of the communication interfaces that is used to receive the data;
  an acquisition unit configured to acquire second user information inputted at a user interface of the information processing apparatus,
    wherein the second user information indicates a user that commands transmission of data to the terminal; and
  a selection unit configured to select one of the communication interfaces for the commanded transmission of data to the terminal in response to the stored correlation information corresponding to the second user information,
    wherein the selection unit is configured to, in response to use histories of the user for the communication interfaces being stored in the storing unit, allow the user to select one of the communication interfaces for the commanded transmission of data.

2. The information processing apparatus according to claim 1, wherein the storing unit is configured to store correlation information including correlation among the user of the terminal, the position of the terminal on the one of the communication networks, and the one of the communication interfaces that is used to receive the data.

3. An information processing method comprising:
  receiving data, by one of a plurality of communication interfaces of an information processing apparatus,
    wherein the communication interfaces are connected to a plurality of independent communication networks,
    wherein the data is received from a terminal connected to one of the communication networks, and
    wherein the one of the communication interfaces is configured to transmit data to the terminal using positional information that indicates a position of the terminal on the one of the communication networks;
  storing, in response to the data being received from the terminal, correlation information including correlation between first user information indicating a user of the terminal sending the data and the one of the communication interfaces that is used to receive the data;
  acquiring second user information inputted at a user interface of the information processing apparatus,
    wherein the second user information indicates a user that commands transmission of data to the terminal; and
  selecting one of the communication interfaces for the commanded transmission of data to the terminal in response to the stored correlation information corresponding to the second user information,
  wherein the selecting comprises, in response to use histories of the user for the communication interfaces being stored, allowing the user to select one of the communication interfaces for the commanded transmission of data.

4. A non-transitory computer readable medium storing a program causing a computer to execute a process comprising:
  receiving data, by one of a plurality of communication interfaces of an information processing apparatus,
    wherein the communication interfaces are connected to a plurality of independent communication networks,
    wherein the data is received from a terminal connected to one of the communication networks, and
    wherein the one of the communication interfaces is configured to transmit data to the terminal using positional information that indicates a position of the terminal on the one of the communication networks;
  storing, in response to the data being received from the terminal, correlation information including correlation between first user information indicating a user of the terminal sending the data and the one of the communication interfaces that is used to receive the data;
  acquiring second user information inputted at a user interface of the information processing apparatus,
    wherein the second user information indicates a user that commands transmission of data to the terminal; and
  selecting one of the communication interfaces for the commanded transmission of data to the terminal in response to the stored correlation information corresponding to the second user information,
  wherein the selecting comprises, in response to use histories of the user for the communication interfaces being stored, allowing the user to select one of the communication interfaces for the commanded transmission of data.

5. The information processing apparatus according to claim 1, wherein the storing unit is configured to extract the correlation information from a job header of a print job received by the information processing apparatus from the terminal.

6. The information processing apparatus according to claim 1, wherein the terminal is external to the information processing apparatus.

\* \* \* \* \*